(No Model.)
J. M. FARMER.
GAS BURNER.
No. 454,640. Patented June 23, 1891.
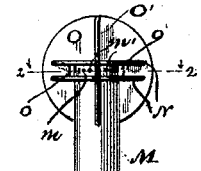
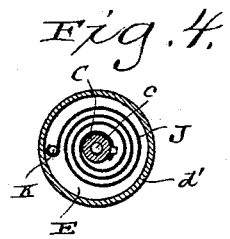
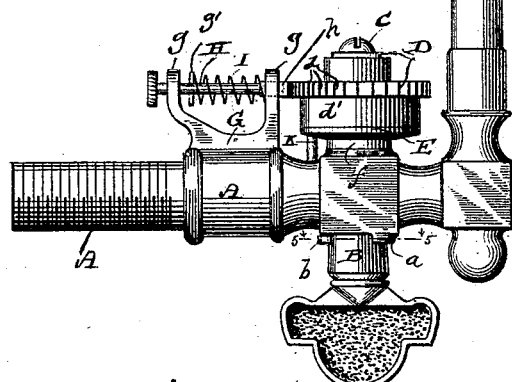
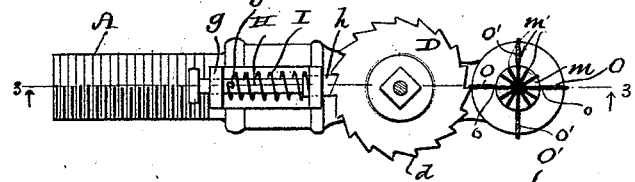
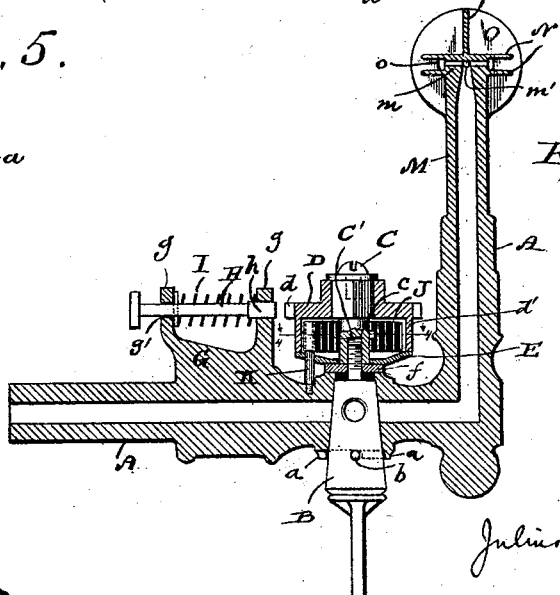
Witnesses
Geo. W. Young.
Jno. L. Condon
Inventor
Julius M. Farmer.
By H. G. Underwood
Attorney

UNITED STATES PATENT OFFICE.

JULIUS M. FARMER, OF MILWAUKEE, WISCONSIN, ASSIGNOR OF ONE-HALF TO MANNING H. CASE, OF SAME PLACE.

GAS-BURNER.

SPECIFICATION forming part of Letters Patent No. 454,640, dated June 23, 1891.

Application filed August 18, 1890. Serial No. 362,293. (No model.)

*To all whom it may concern:*

Be it known that I, JULIUS M. FARMER, of Milwaukee, in the county of Milwaukee, and in the State of Wisconsin, have invented certain new and useful Improvements in Gas-Burners; and I do hereby declare that the following is a full, clear, and exact description thereof.

My invention relates to gas-burners; and my invention consists in certain peculiar and novel features of construction and arrangement, as hereinafter described, and pointed out in the appended claims.

In the drawings, Figure 1 is a side elevation of a gas-burner bracket with my improvements applied thereto. Fig. 2 is a plan view of the same, partially in section, on the line 2 2 of Fig. 1. Fig. 3 is a central vertical section of the same on the line 3 3 of Fig. 2. Fig. 4 is a sectional view on the line 4 4 of Fig. 3. Fig. 5 is a similar view of the same on the line 5 5 of Fig. 1.

The object of my invention is to produce a gas-burner, the cock or valve of which can be readily closed and which shall remain in open condition as long as desired. This result I attain by virtue of the construction which I will now proceed to describe.

Referring to the drawings, A designates a gas-bracket, and B a cock or plug-valve located therein and having a pin $b$, which matches with a stop-ring $a$ on the under side of said bracket. The upper end of this plug carries an externally-screw-threaded screw-stem $c$, which enters an internally-screw-threaded socket $C'$ in the lower end of a screw C. The upper end of this screw is enlarged to pass through an enlargement in a cap D, the latter being provided on its periphery with ratchet-teeth $d$. The upper side of the bracket A is formed with a U-shaped bracket G, the arms $g$ $g$ of which are formed with holes $g'$ to receive a horizontal pin H. This pin is surrounded by a spiral spring I, which is confined between a pin $g'$ and one of the said arms $g$, and the inner end of said pin is formed or provided with a tooth $h$, which is arranged to engage the teeth $d$ of cap D. This cap is formed also with a downwardly-extending flange $d'$, the lower edge or margin of which matches with a cup-shaped disk E, which surrounds the lower end of the screw C, a washer $f$ being interposed between the under side of the disk and the upper side of the bracket A. The flange $d'$ serves as a casing for a spiral spring J, the inner end of which is secured to the screw C, while its outer end is secured to the upper end of a pin K, which is rigidly secured to the upper side of the bracket A and extends through the disk E.

From the above description it will be seen that the cock is held normally in closed position by the spring J. When the cock is opened, the pin H is pushed forward, so as to throw its tooth $h$ into engagement with the teeth $d$ of the cap D, and thus by the action of the spring J upon the head $h$ the cock B is retained in open position. A slight backward turn upon the cock will cause the spring I to retract the pin H, and the spring J will then automatically turn the cock B, so as to shut off the flow of gas to the burner M. The tip $m$ of burner M is formed with a number of lateral channels $m'$, above and below the outer ends of which are located two horizontal flanges N N. Two oppositely-disposed disk-flanges O O' are placed vertically with relation to the horizontal flanges N, and each of said disk-flanges is formed with an aperture $o$. (See Fig. 1.) Thus the flame can never be entirely extinguished by the wind, even if the burner be in an exposed position, because the horizontal and vertical flanges shield the flame on all sides and the openings $o$ permit oxygen to circulate between the outer ends of the channels $m'$ which may happen to be away from the direction of the wind, so that the outflowing gas will be maintained in an ignited condition. It will thus be seen that I have produced a structure which effectively meets all of the requirements of gas-burners and which is simple and compact in its construction. Moreover, my burner is a safety gas-burner and incapable of being extinguished not only by the wind blowing against it, as stated, but also by any voluntary attempt to blow the light out, and herein is especially adapted for hotel and other bed-rooms intended to be occupied by those unfamiliar with gas-fixtures.

Having thus described my invention, what I claim as new, and desire to secure by Letters Patent, is—

1. The combination, with a gas-bracket having a two-armed bracket on its upper side, of a valve or cock provided with a serrated cap and a horizontally-moving pin working through the arms of the bracket and having a tooth to engage the said serrated cap upon the valve or cock, and a transverse pin passed through said horizontally-moving pin intermediate of the two arms of said bracket, and a spiral spring surrounding said horizontally-moving pin between said transverse pin and one of said bracket-arms, substantially as set forth.

2. The combination, with a gas-bracket, of a plug or cock having a screw-threaded upper end, a screw fitting at its lower end over the said upper end of the plug, a spiral spring secured at one end to the screw and at its opposite end to a pin upon the bracket, and a flanged cap surrounding the screw and serving as a casing to inclose the spring, said casing having a perforation in its under wall for the passage of the said pin therethrough, substantially as set forth.

In testimony that I claim the foregoing I have hereunto set my hand, at Milwaukee, in the county of Milwaukee and State of Wisconsin, in the presence of two witnesses.

JULIUS M. FARMER.

Witnesses:
H. G. UNDERWOOD,
LAWSON SCOTT.